F. KULBAKA.
FLYTRAP.
APPLICATION FILED MAY 7, 1920.
1,359,998.
Patented Nov. 23, 1920.
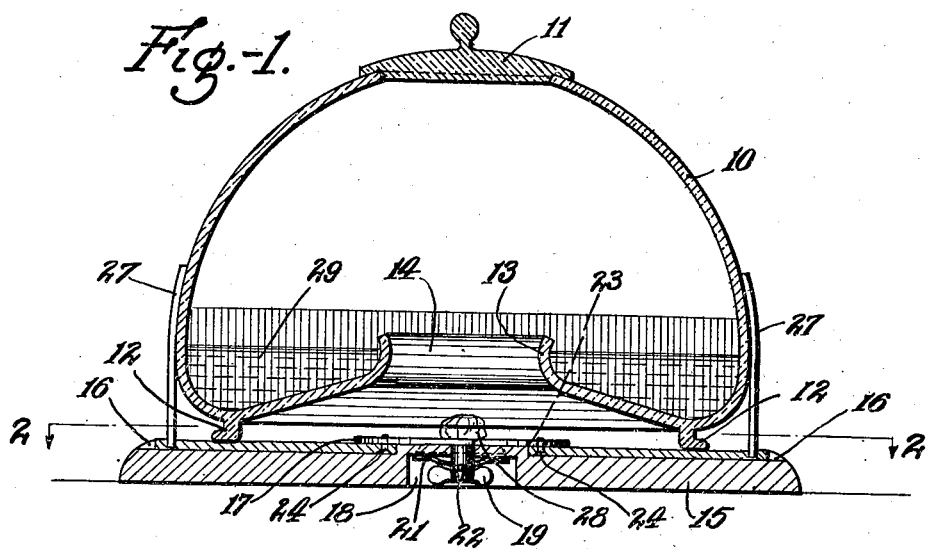
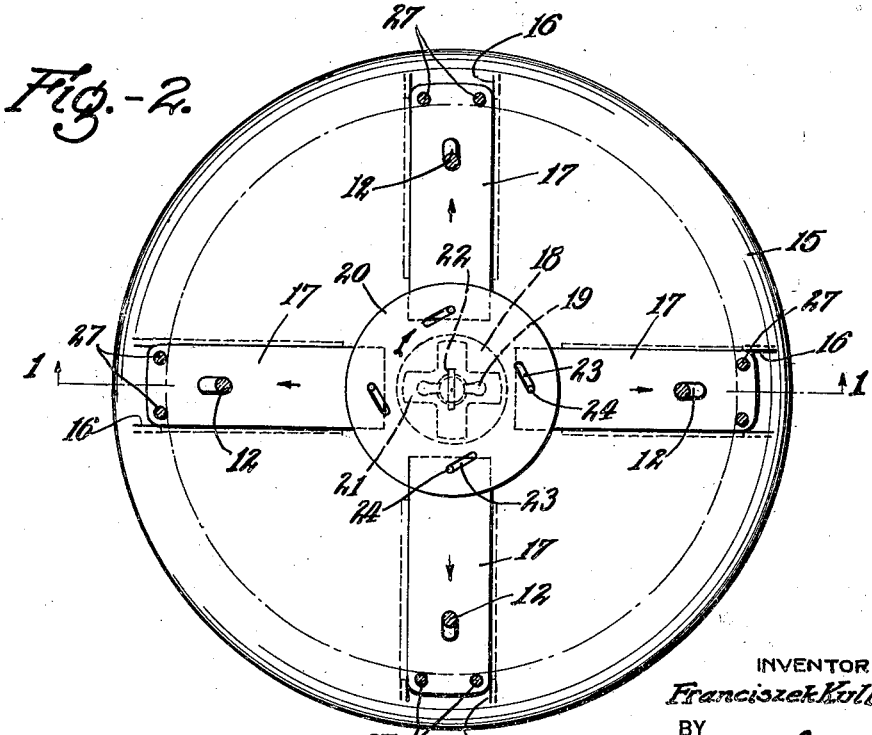
INVENTOR
Franciszek Kulbaka
BY
Harry Jacobson
ATTORNEY

UNITED STATES PATENT OFFICE.

FRANCISZEK KULBAKA, OF WEST ALBANY, NEW YORK.

FLYTRAP.

1,359,998.  Specification of Letters Patent.  Patented Nov. 23, 1920.

Application filed May 7, 1920. Serial No. 379,455.

*To all whom it may concern:*

Be it known that I, FRANCISZEK KULBAKA, citizen of Poland, residing at West Albany, in the county of Albany and State of New York, have invented certain new and useful Improvements in Flytraps, of which the following is a specification.

This invention relates to fly trap holders and especially to those designed to hold traps which are made of glass or which are so shaped as to be difficult to handle.

The object of this invention is to provide a stand for firmly holding the fly trap so that it may readily be moved from place to place without danger of slipping out of the hands and breaking.

A further object of this invention is the provision of means for detaching the trap from the stand for the purpose of cleaning said trap.

To attain the above and other objects, I employ the device shown in its preferred form in the accompanying drawings, in which, Figure 1 is a vertical section of my invention as it appears when holding a fly trap, the section being taken on line 1—1 of Fig. 2. Fig. 2 is a horizontal section on line 2—2 of Fig. 1, and shows the means used for securing the trap to the stand.

In the practical embodiment of my invention, the fly trap 10, having a removable cover 11 and spaced legs 12 thereon, is made with a reëntrant base 13, which is provided with an opening 14. My improved holder comprises a base 15, of suitable material, in which shallow grooves 16 are cut to receive slides 17. In the center of base 15, an opening 18 is made, reaching up from the bottom of said base and extending part way therethrough, to receive a wing nut 19, which is suitably secured to a cam disk 20 resting on the upper face of the base 15. A cross shaped flat spring 21 is secured to the upper end of opening 18, and presses against pin 22, passing through the shank of nut 19, whereby said nut is pressed downwardly, keeping disk 20 in close contact with the upper face of base 15. Cam slots 23 are cut in disk 20, pins 24 of slides 17 engaging said cam slots so that rotation of said disk causes said slides to move radially of said disk in grooves 16. Spring wire fingers 27 at the outer ends of slides 17 serve to firmly grip the trap 10 in the innermost position of said slides, and release the trap for easy removal from the holder in the outermost position of said slides.

Suitable fly bait 28 may be placed on cam disk 20 or at any other convenient point so as to attract flies, which enter the trap between legs 12 and after passing through the opening 14, fly around till they drop into a liquid 29, which is usually water.

For removing the trap from the stand for cleaning purposes, wing nut 19 is turned in the proper direction, rotating cam disk 20, and causing slides 17 to move outwardly to release fingers 27 from contact with the trap. To secure the trap in the holder, the operation is reversed.

It will be seen that danger of breaking the trap in moving, due to the slippery surface or to the peculiar shape of the trap, is lessened when held in my improved stand, and that a firm support with a wide spreading base such as is provided serves also to lessen the danger of tipping over the stand by an accidental sudden movement.

I claim:

1. In a device of the character described, a base, a series of slides radially movable on said base, trap holding fingers mounted on the outer ends of said slides, pins fixed on the inner ends of said slides, a disk rotatably mounted on said base centrally thereof, said disk having cam slots engaged by said pins, and means extending through said base and operable from the underside thereof for rotating said disk to move said slides.

2. In a device of the character described, a base, trap holding fingers, and means for moving said fingers radially of said base comprising slides on which said fingers are fixed, pins at the inner ends of said slides, a cam disk having cam slots engaged by said pins, and means for rotating said disk.

3. In a device of the character described, a base, trap holding fingers slidably mounted on said base, means for moving said fingers radially of said base, and a spring for holding said finger moving means on said base.

4. In a device of the character described, a base, trap holding fingers slidably mounted on said base, means for moving said fingers radially of said base comprising slides, pins at the inner ends of said slides, a cam disk having cam slots engaged by said pins and means for rotating said disk, and a spring for holding said finger moving means on said base.

In testimony whereof I have affixed my signature this 26 day of April, 1920.

FRANCISZEK KULBAKA.